US007883197B2

(12) United States Patent
Mantell et al.

(10) Patent No.: US 7,883,197 B2
(45) **Date of Patent: *Feb. 8, 2011**

(54) TRANSPORT SYSTEM HAVING SINGLE INSERTION PORT FOR SOLID INK DELIVERY IN A PRINTER

(75) Inventors: David Allen Mantell, Rochester, NY (US); Brent Rodney Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 477 days.

This patent is subject to a terminal disclaimer.

(21) Appl. No.: 12/038,193

(22) Filed: Feb. 27, 2008

(65) Prior Publication Data

US 2009/0213196 A1 Aug. 27, 2009

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99

See application file for complete search history.

(56) References Cited

U.S. PATENT DOCUMENTS 5,223,860 A 6/1993 Loofbourow et al.
5,442,387 A 8/1995 Loofbourow et al.
5,510,821 A 4/1996 Jones et al.
5,734,402 A 3/1998 Rousseau et al.
5,861,903 A 1/1999 Crawford et al.
5,975,690 A * 11/1999 Grellmann et al. ............ 347/88
6,056,394 A 5/2000 Rousseau et al.
6,543,867 B1 4/2003 Jones
6,572,225 B1 6/2003 Jones
6,679,591 B2 1/2004 Jones
6,705,710 B2 3/2004 Jones et al.
6,709,094 B2 3/2004 Jones
6,719,413 B2 4/2004 Jones
6,722,764 B2 4/2004 Jones et al.
6,746,113 B1 * 6/2004 Leighton et al. .............. 347/88
6,893,121 B2 5/2005 Jones
6,986,570 B2 1/2006 Jones et al.
7,104,635 B2 9/2006 Jones

* cited by examiner

*Primary Examiner*—An H Do
(74) *Attorney, Agent, or Firm*—Maginot, Moore & Beck LLP

(57) ABSTRACT

A method is implemented to deliver a solid ink stick from a single insertion port to a corresponding feed channel to help ensure that each feed channel in a plurality of feed channels contains only ink sticks corresponding to the feed channel. The method includes receiving solid ink sticks in a single insertion port, identifying each ink stick received in the single insertion port, and transporting each identified ink stick from the single insertion port to one feed channel in a plurality of feed channels to enable delivery of the identified ink stick to the melting assembly appropriate for the identified ink stick.

20 Claims, 7 Drawing Sheets

TRANSPORT SYSTEM HAVING SINGLE INSERTION PORT FOR SOLID INK DELIVERY IN A PRINTER

TECHNICAL FIELD

The single insertion port transport system disclosed below generally relates to solid ink printers, and, more particularly, to solid ink printers having multiple feed channels for solid ink sticks.

BACKGROUND

Solid ink or phase change ink imaging devices, hereafter called solid ink printers, encompass various imaging devices, such as printers and multi-function devices. These printers offer many advantages over other types of image generating devices, such as laser and aqueous inkjet imaging devices. Solid ink or phase change ink printers conventionally receive ink in a solid form, either as pellets or as ink sticks. A color printer typically uses four colors of ink (yellow, cyan, magenta, and black).

The solid ink pellets or ink sticks, hereafter referred to as ink, sticks, or ink sticks, are delivered to a melting device, which is typically coupled to an ink loader, for conversion of the solid ink to a liquid. A typical ink loader includes multiple feed channels, one for each color of ink used in the imaging device. Each channel has an insertion opening in which ink sticks of a particular color are placed and then either gravity fed or urged by a conveyor or a spring-loaded pusher along the feed channel. Each feed channel directs the solid ink within the channel towards a melting device located at the end of the channel. Each melting device receives solid ink from the feed channel to which the melting device is connected and heats the solid ink impinging on it to convert the solid ink into liquid ink that is delivered to a print head for jetting onto a recording medium or intermediate transfer surface.

Each feed channel insertion opening may be covered by a key plate having a keyed opening. The keyed openings help ensure a printer user places ink sticks of the correct color in a feed channel. To accomplish this goal, each keyed opening has a unique shape. The ink sticks of the color corresponding to a particular feed channel have a shape corresponding to the shape of the keyed opening. The keyed openings and corresponding ink stick shapes exclude from each ink feed channel ink sticks of all colors except the ink sticks of the proper color for the feed channel. Unique keying shapes for other factors are also employed in keyed openings to exclude from a feed channel ink sticks that are formulated or intended for other printer models.

As the number of pages printed per minute increases for solid ink printers so does the demand for ink in the printer. To supply larger amounts of ink to printers, the cross-sectional area of the feed channels may be increased. Consequently, the insertion openings for the channels and the keyed plates covering the openings are likewise enlarged. These larger openings enable smaller solid ink sticks to pass through without engaging the keyed plates over the openings. Thus, solid ink sticks that do not conform to the appropriate color for a feed channel can be loaded into the feed channel and delivered to the melting device at the end of the feed channel. Even if the smaller stick is the correct color for the feed channel, its size may impair the ability of the stick to cooperate with guiding structure within the feed channel. Thus, ensuring each feed channel in a solid ink printer is loaded only with ink sticks configured for transport within the feed channel is a desirable goal.

SUMMARY

A system enables a solid ink printer to be operated with a reduced risk that inappropriate ink sticks are loaded into a feed channel. The system includes a single insertion port that receives solid ink sticks, a plurality of feed channels, each of which terminates into a melting device that heats solid ink sticks to a melting temperature, a sensor that identifies a solid ink stick received in the single insertion port; and an ink stick transporter configured to move solid ink sticks from the single insertion port to one of the feed channels in the plurality of feed channels to enable delivery of the identified solid ink stick to a melting assembly.

A method for delivering solid ink sticks from a single insertion port to a corresponding feed channel in a plurality of feed channels is also disclosed below. The method includes receiving solid ink sticks in a single insertion port, identifying each ink stick received in the single insertion port, and transporting each identified ink stick from the single insertion port to one feed channel in a plurality of feed channels to enable delivery of the identified ink stick to the melting assembly appropriate for the identified ink stick.

BRIEF DESCRIPTION OF THE DRAWINGS

Features for transporting solid ink from a single insertion port to a corresponding feed channel in a plurality of feed channels within a solid ink printer are discussed with reference to the drawings, in which.

DETAILED DESCRIPTION

Figure 1:
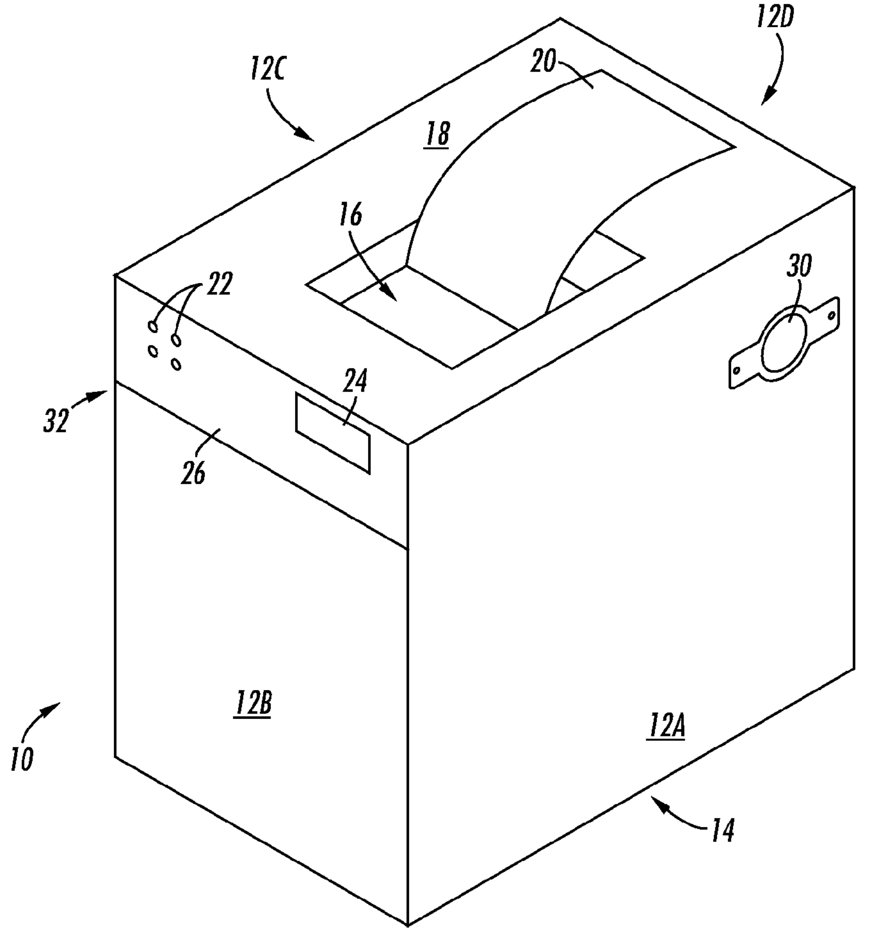
FIG. 1 is a perspective view of a solid ink printer having a single insertion port for receiving solid ink sticks.

The term "printer" refers, for example, to reproduction devices in general, such as printers, facsimile machines, copiers, and related multi-function products. An exemplary solid ink printer having a solid ink transport system that moves solid ink sticks from a single insertion port to a feed channel within the printer is shown in FIG. 1. The printer 10 includes a housing 32 having four vertically standing side walls 12A, 12B, 12C, and 12D, a bottom surface 14, and a top surface 18. Although the printer 10 is depicted in a shape that may be described as a rectangular solid, other shapes are possible. Additionally, the surfaces of the housing need not be smooth, but may undulate or otherwise include depressions and protrusions to accommodate internal components or enhance the visibility of external features. The housing may also include a control panel 26 having a display 24 and one or more function keys 22 or other control actuators.

The upper surface 18 of the housing 32 may include, for example, an output tray 16. Recording media, such as a paper sheet 20, exit the housing 32 and rest in the output tray 16 until retrieved by a user or operator. The housing 32 may include a media supply tray (not shown) from which recording media may be removed and processed by the printer 10. While the output tray 16 is shown as being in the upper surface 18 of the housing 32, other positions are possible, such as extending from rear wall 12D or one of the other side walls.

As shown in FIG. 1, a single insertion port 30 may be provided in a side wall of the housing 32. Although the opening is depicted as being in the side wall 12A, it may be located in one of the other side walls or in the upper surface 18 or associated with an appendage to the printer. In another embodiment, the housing 32 may include a hinged or other displaceable cover that may be opened to expose the single insertion port 30. Solid ink sticks are inserted into the port 30 by an operator. The port 30 is preferably configured to accept a range of different colors and types of solid ink sticks, although the opening may be sized to prevent some ink sticks from being inserted into the port 30. The port 30 is configured to accept different colors and different types of ink sticks because a sensor within the port obtains identification data from each ink stick inserted in the port. These data are compared to other data stored in the printer, as described in more detail below, to identify the ink sticks. The identified ink sticks are then moved to the feed channel within the printer that corresponds to the ink stick identification. Ink sticks not corresponding to the ink stick identification data may be moved to a reject location, such as a bin, or an indicator may be activated to notify the operator that an inappropriate ink stick has been loaded into the port and should be removed.

Figure 2:
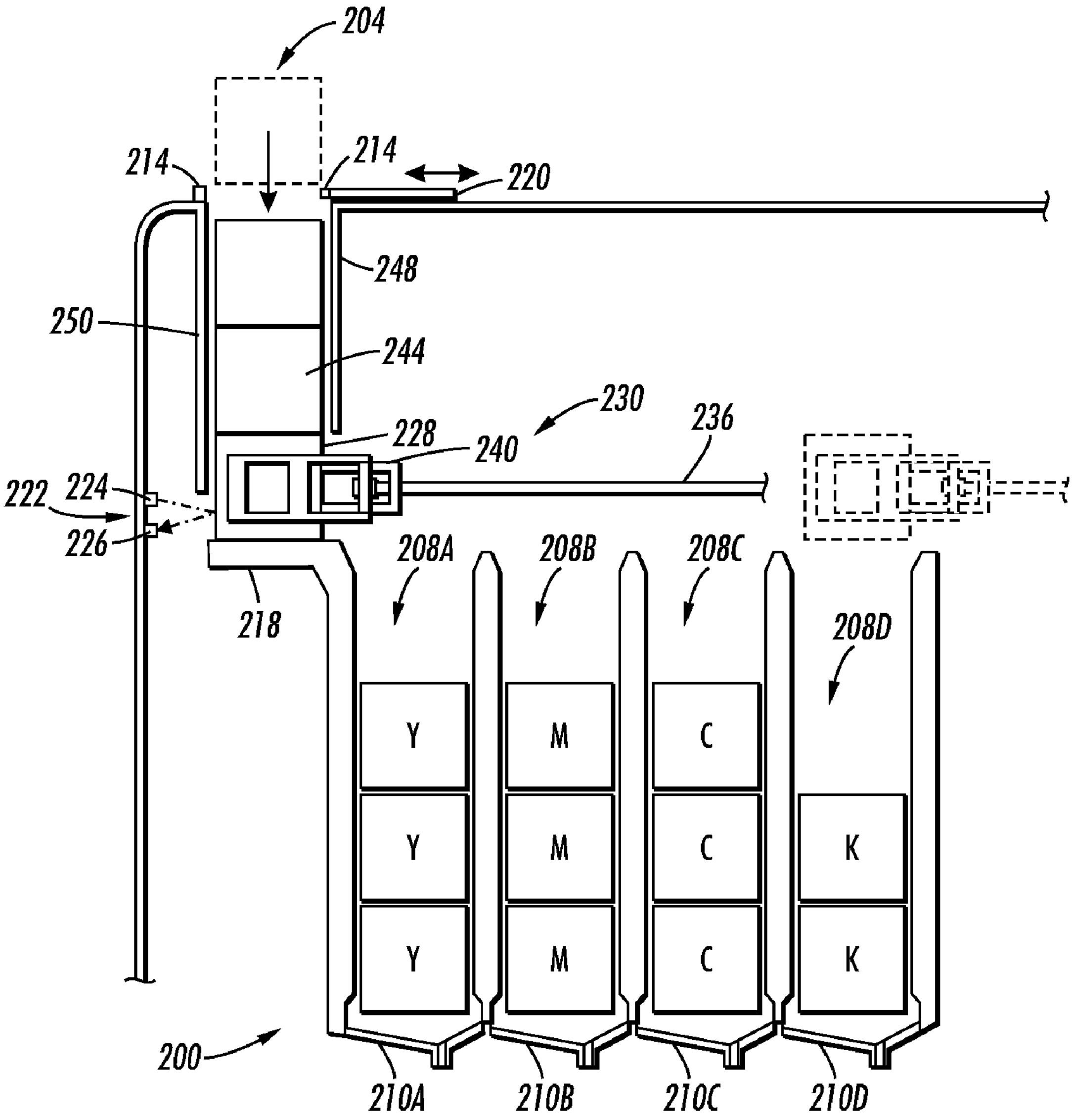
FIG. 2 is a front view of a system having a single ink insertion port for multiple feed channels.

An embodiment of a system for identifying and moving solid ink sticks inserted in a single insertion port is shown in FIG. 2. The system 200 includes a single insertion port 204 and four feed channels 208A, 208B, 208C, and 208D, which terminate in melt assemblies 210A, 210B, 210C, and 210D, respectively. The single insertion port 204 has a landing ledge 218. A cover 220 may be provided that is selectively displaceable with respect to the port 204. In one embodiment, moving the cover 220 to expose the port 204 generates a signal to indicate a solid ink stick is present in the ink stick identification area and, thus, activate the ink stick identification process. For example, contacts 214 may be configured on the housing and cover to generate a signal indicative of the state of the cover 220 for a processor (not shown) in the printer. As shown in FIG. 2, a sensor 222, which includes an optical source 224 and an optical detector 226, is proximate the landing ledge 218 so the sensor is enabled to obtain identification data from the ink stick on the landing ledge 218 and provide it to the processor in the printer. In the embodiment shown in FIG. 2, the optical source 224 illuminates the solid ink stick 228 resting on the ledge 218 and the optical detector 226 receives reflected light from the illuminated surface of the ink stick 228. In response to the reflected light, the optical detector generates an electrical signal corresponding to the identification data on the solid ink stick 228. The detection of a light signal at the optical detector 226 may also be used to indicate the presence of a solid ink stick in the insertion port. For example, the optical source 224 may be enabled to continuously emit light, however, that light is not reflected into the optical detector 226 until an ink stick is located opposite the optical sensor. Thus, detection of a reflected signal for a predetermined period of time may be used to detect a solid ink stick in the insertion port. In response to this signal, the processor controlling the identification process may enable the identification sensor to obtain identification data from the solid ink stick or the processor may be begin to receive identification data. Although the discussion below relates to an optical sensor, a mechanical sensor that interacts with structural features of solid ink sticks may be used to generate an electrical signal indicative of the identification data for a solid ink stick.

Figure 5:
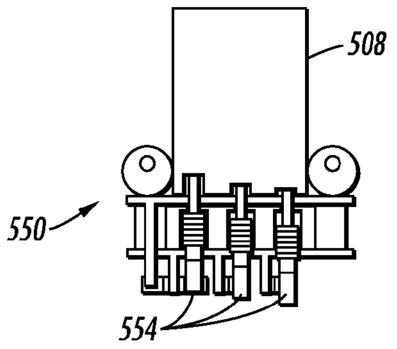
FIG. 5 is a depiction of a single insertion port having a mechanical sensor for obtaining ink stick identification data from an ink stick placed in the port.

A mechanical sensor that interacts with structural features of solid ink sticks may be used to generate an electrical signal indicative of the identification data for a solid ink stick. An example of such a mechanical sensor is shown in FIG. 5. The sensor 550 includes a plurality of spring biased actuators 554 that interact with the surface of an ink stick in an insertion port. The extension of the actuators interacting with the surface of the ink stick 508 is detected and used to generate an electrical signal corresponding to the ink stick identification data for the ink stick. This signal is provided to a processor for the ink stick identification process as described below. As noted above with reference to the optical sensor, the mechanical sensor may also be used to detect a solid ink stick in the insertion port. That is, a solid ink stick encountering the mechanical actuators of the sensor displaces the actuators and generates one or more signals. Detection of a signal generated by such displacement for a predetermined period of time may be used to detect a solid ink stick in the insertion port. In response to this signal, the processor controlling the identification process may enable the identification sensor to obtain identification data from the solid ink stick or the processor may be begin to receive identification data. Alternatively or additionally, a separate sensor may be provided in the insertion port to detect a solid ink stick and generate a signal indicative of the solid ink stick's presence in the port.

Although the embodiment shown in FIG. 2 uses gravity to direct the solid ink stick to an area for the identification process, other loading mechanisms may be used. For example, a transporter, such as an endless belt, may be located proximate the port opening. In response to a solid ink stick being placed on the transporter, the transporter may be activated to move the ink stick to a position where a sensor can obtained identification data from the ink stick. The transporter may be activated by a user depressing an electrical actuator after loading an ink stick into the insertion port or a sensor located proximate the port opening may be used to detect the ink stick and activate a transporter to move the ink stick to the ink stick identification area.

To identify whether an ink stick at the ink stick identification area corresponds to one of the feed channels in the printer 10, a processor within the printer receives the electrical identification signal from the sensor 222, which in the embodiment of FIG. 2 includes the optical detector 226, and compares the identification data obtained from the electrical signal to identification data for ink sticks stored in a memory of the printer. If the identification data obtained from the solid ink stick corresponds to stored identification data, the processor operates the ink stick transporter 230, as described more fully below, to move the ink stick to the feed channel corresponding to the identification data for the identified ink stick.

Figure 3:
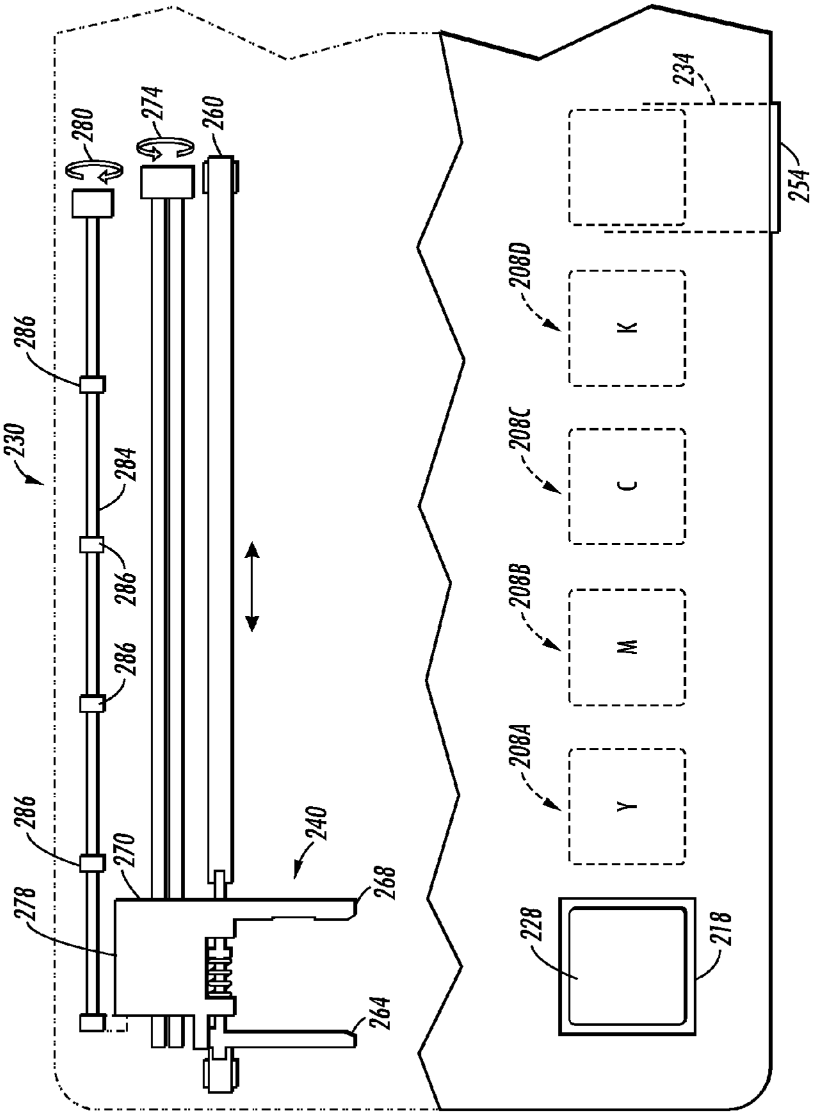
FIG. 3 is a top view of the system shown in FIG. 2.

With further reference to FIG. 2, an ink stick transporter 230 moves an ink stick from the landing ledge 218 to one of the feed channels or to a reject channel 234 (FIG. 3). The transporter 230 includes a drive mechanism 236 and a solid ink stick clamp 240. In response to the ink stick identification process, the processor performing the identification process activates the motive force for the drive mechanism 236 to move the clamp 240 towards the ink stick 228. The drive mechanism 236 may include a stepping motor or other electromechanical source of motive force that is coupled to a leadscrew, traction drive, or other motion device to move the clamp 240. The clamp 240 is opened so the jaws of the clamp are placed about the ink stick 228 resting on the landing ledge 218 when the drive mechanism 236 reaches the grasping zone in its travel towards the landing ledge 218. In response to a signal from the processor indicating the identification process is complete, the jaws are clamped against the ink stick 228 and the drive mechanism is reversed. This operation removes the solid ink stick 228 from the landing ledge 218 and carries the solid ink stick in the jaws of the clamp 240 along a path that is above the feed channels 208A, 208B, 208C, and 208D. The next solid ink stick 244 drops onto the landing ledge 218 for the identification process. Guide walls 248 and 250 help keep the ink stick 244 in the correct orientation for the identification process as it drops onto the landing ledge. The processor stops the drive mechanism 236 when the stick in the clamp 240 has traveled a predetermined distance or time that corresponds to the location of the feed channel for the type of stick identified in the identification process. The clamp 240 is then opened to release the ink stick so it falls into the corresponding feed channel. For those ink sticks not having identification data that corresponds to one of the feed channels, the drive mechanism continues until it reaches the terminal point of its withdrawal movement, which is aligned with a reject bin 234 (FIG. 3). The clamp 240 is then opened to release the ink stick so it falls into the reject bin 234. The reject bin 234 has an opening 254 through which the ink stick may be retrieved.

As shown in FIG. 3, the landing ledge 218, the feed channels 208A, 208B, 208C, and 208D, and the reject bin 234 are depicted from a top view. The transporter 230 is also illustrated as having a band drive 260 with rotating jaws 264 and 268 at one end. The jaw 268 has a mounting block 270 through which clamp drive 274 is mounted. The outboard edge 278 of the block 270 is proximate a rotating stop member 280. In this embodiment of the transporter 230, the clamp jaws are rotated to a clear position as the band drive 260 translates the jaws 264 and 268 towards an ink stick on the landing ledge 218. At the end of the band drive's travel, the band drive 260 and the jaws 264 and 268 rotate downwardly so the ink stick 228 can be grasped. The band drive 260 may then pull the jaw 264 towards the jaw 268 to secure a grip about the ink stick 228. Alternatively or additionally, jaw 268 may be driven towards the jaw 264 to secure the ink stick within the clamp 240. The stop member 280 includes a rod 284 and a number of stops 286 that correspond to feed channel positions. Each of the stops is located at a different angular position about the rod 278. In response to the stick being identified, the processor rotates the stop member rod 284 so the stop 286 that contacts die leading edge of the mounting block 270 at the corresponding feed channel is rotated into the path of the mounting block as it is pulled by the band drive 260. In response to the mounting block 270 contacting one of the stop members 286, the clamp drive 274 translates the jaw 264 away from the stick so it falls into the corresponding feed channel.

Figure 4:
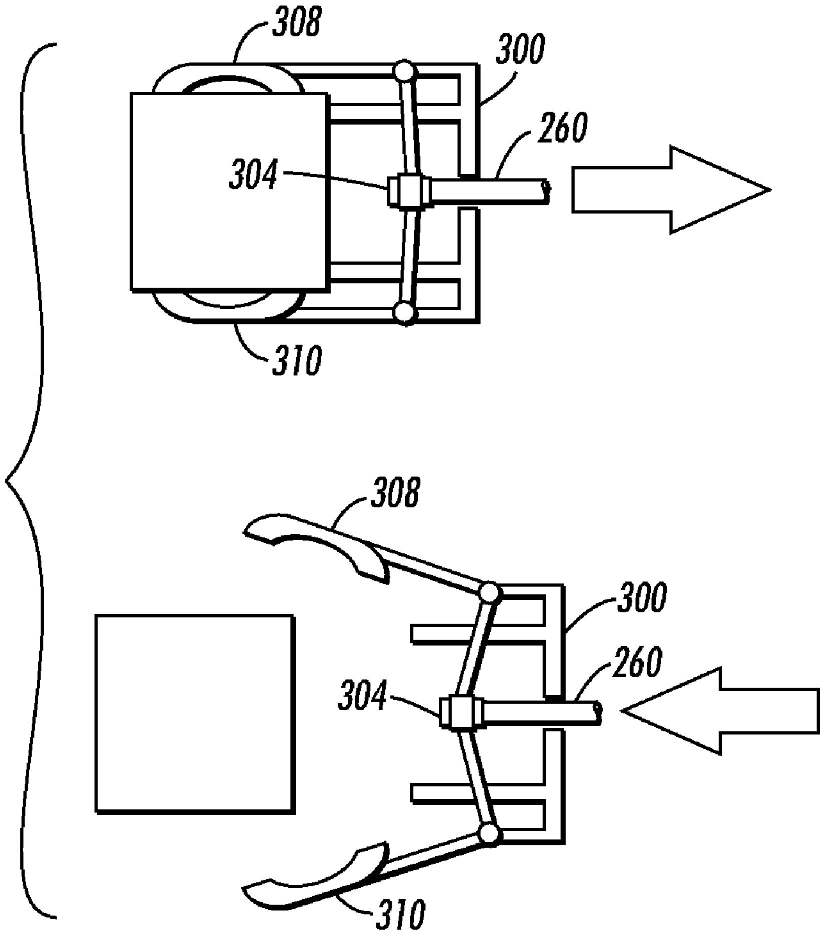
FIG. 4 is an alternative embodiment of the clamping structure shown in FIG. 3.

An alternative configuration of the transporter 230 is shown in FIG. 4. In this embodiment, the drive 260, which may be a band drive, leadscrew, or other driving mechanism, is coupled through a support 300 to a pivot coupling 304 for a pair of pivoting jaws 308, 310. In response to the drive pushing the pivot coupling 304 towards the ledge 218, the jaws open to receive the ink stick resting on the ledge. As the band drive is retracted from ledge 218, the jaws 308, 310 pivot through the action of the coupling 304 to a closed position to trap the ink stick. When the correct feed channel or reject bin is reached, the band drive direction is reversed to open the jaws and release the ink stick.

Figure 6:
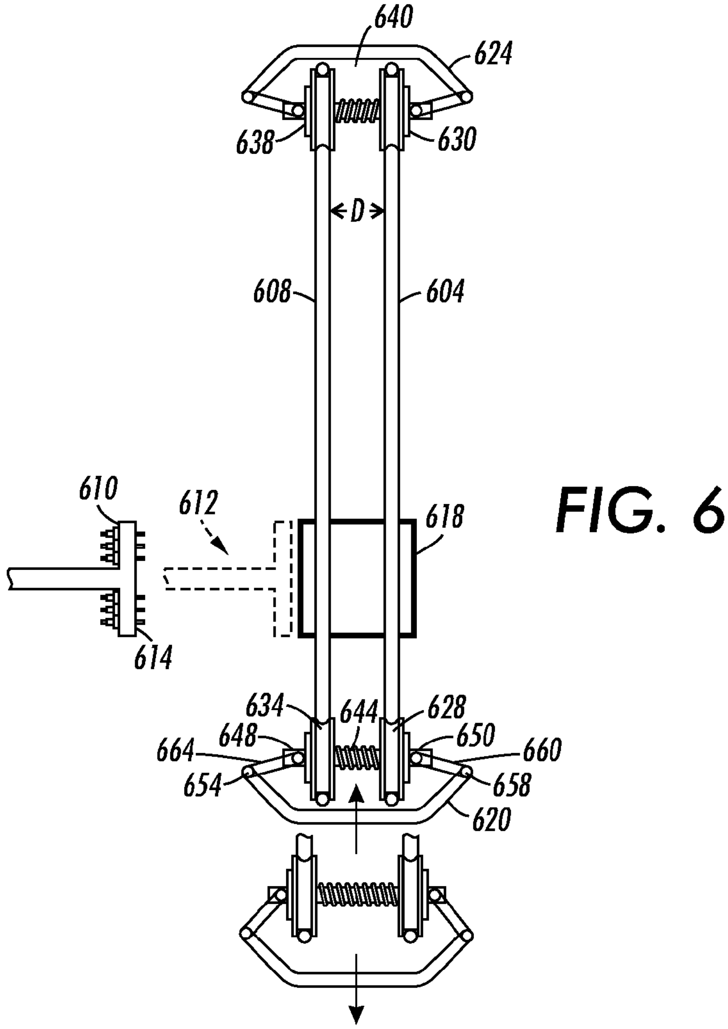
FIG. 6 is an alternative embodiment of an ink stick transporter used to move an ink stick from the single insertion port to a corresponding feed channel.

Another alternative configuration of the transporter 230 is shown in FIG. 6. In this embodiment, a pair of equal length endless belts 604, 608 are arranged to be parallel to one another and separated by a distance D. Adjacent to one side of the insertion port 612, is an ink stick sensor/pusher arm 610. As shown in FIG. 6, the pusher arm has a T configuration although other shapes and configurations may be used. Within the portion of the pusher arm 610 immediately adjacent the insertion port 612 are sensors 614. These sensors may be optical sensors, mechanical sensors, RFID interrogators, or the like. These sensors 614 obtain ink stick identification data from the ink stick in the insertion port area 612. The identification data are transmitted to a processor for comparison to identification data stored in memory to identify an ink stick in the insertion port area 612. The outboard end of the arm 614 is coupled to an actuator (not shown), such as an electrical motor. The rotational or linear displacement of the motor may be coupled through a drive train to move the pusher arm in a reciprocating manner. The endless belts 604, 608 are vertically positioned with reference to the insertion port 612 to enable the pusher arm to move an ink stick from the insertion port onto the endless belts. The pusher arm 610 is shown in phantom in FIG. 6 at the position where it has pushed the ink stick 618 onto the endless belts 604, 608.

Belt 604 is mounted about pulleys 628 and 630 while belt 608 is mounted about pulleys 634 and 638. At least one pulley in each pair of pulleys about which an endless belt is mounted is driven by an actuator (not shown) coupled to the pulley through a drive train or the like. Preferably, the pulleys driven by the actuator are coupled to the same actuator, although they may be driven with different actuators. One or both of the spreader bars 624 and 620 are also coupled to an actuator in a manner similar to that described above for the pusher arm 610. Coupling links 660, 664 are pivotally connected to the ends of the spreader bar 620. Coupling links are similarly connected to the ends of the spreader bar 624. The other ends of the coupling links 660, 664 are connected to collars 650, 648, respectively. Again, the other ends of the links coupled to spreader bar 624 are similarly connected to collars that abut the pulleys 630, 638. Interposed between the pulleys 628, 634 is a compressed spring 644 while a compressed spring 640 is interposed between the pulleys 630, 638. Thus, the coupling links and collars help hold the pulleys stationary against the outward urging of the compressed springs 640 and 644. When the actuator coupled to the spreader bars 624 and 620 move the spreader bars away from one another, the pivotally connected ends of the coupling links follow the spreader bars. This action causes the collars to move outwardly under the urging of the compressed springs. The pulleys at the ends of the compressed springs are pushed outwardly with the collars. This position is demonstrated by the spreader bar configuration shown at the lower end of FIG. 6. When the actuator is energized to push the spreader bars towards each other, this movement is reversed and the pulleys 628, 634 move towards each other as do the pulleys 630, 638. This position is shown at each end of the endless belts connected by the endless belts in FIG. 6. Movement of the spreader bars may be accomplished with a processor controlling a single actuator coupled to both spreader bars or by a pair of actuators, each one being controlled by the processor to energize the actuators and move one of the spreader bars.

The actuators driving the pulleys for rotating the endless belts 604, 608, the actuator for moving the pusher aim 614, and the actuator(s) that move the spreader bars may be coupled to a single processor. The processor generates the control signals for energizing the actuators at select times to drive the belts 604, 608, move the pusher arm 610, and operate the spreader bars independently of one another. In this manner, the belts are stopped from rotating while an ink stick is being pushed onto the endless belts 604, 608 by the pusher arm 610. Thereafter, the pulleys are driven to rotate the endless belts 604, 608 and transport the ink stick on the belts. In response to the identification data comparison, the processor drives the endless belts a predetermined distance that corresponds to the feed channel for which the ink stick was configured. The processor then energizes the actuator(s) for moving the pulleys at each end of the belts away from one another. This action spreads the belts apart by a distance that is greater than the width of the ink stick resting on the belts. Thus, the ink stick falls into one of the feed channels below the transporting belts. The feed channels are not shown in FIG. 6, but are arranged beneath the belts to receive the ink sticks as they fall from the belts when the belts are separated from one another by the spreader bars moving away from one another. A reject bin may be provided underneath the belts between the two ends of the endless belts or it may be provided at one end. In the latter arrangement, the belts may be operated to have the ink stick fall off the end of the belts into the reject bin.

Although the operation of the transporter shown in FIG. 6 has been described as moving endless belts away from and towards one another, other schemes of operation may be used. For example, the spreader bar 620 may be sized to enable the ends coupled to the bar 620 to move sufficiently apart that the ends of the endless belts 604 and 608 at the opposite end separate from one another by distance that is greater than D. In this embodiment, only one spreader bar is required for operation of the transporter. In another embodiment, both ends of only one endless may be translated in a reciprocating manner from the other stationary endless belt to open and close the pair of endless belts for carrying ink sticks to a feed channel or reject bin and dropping the ink sticks at the channel or bin. Ink sticks released from a transport have been described as dropping into a feed channel. The simplified description of the color channel or reject path drop process works with gravity feed but the terms drop, dropping, dropped and so forth are intended to encompass all manner of subsequent feed motion and force, including a mechanized force, a force generated by gravity exclusively or a force generated by gravity in conjunction with a mechanized force.

In embodiments in which an electrical motor is coupled to a movable drive, such as an auger, leadscrew, or push rod, the rotational output of the motor, which may be bidirectional, may be coupled to the movable drive through one or more gears. The gears may be employed to attain an appropriate speed range for the linear movement of a pushrod or rotation of an auger. Additionally, the gears may be used to change the direction of the rotation input by the motor. The motors are coupled to a processor or other control component to receive electrical signals that enable the motors to be energized and control their speed as well as the direction of the motor output, if the motor is bidirectional.

In the embodiments described above, the processor configured to perform the identification process and operate the solid ink stick transporter may be the controller for the printer or a separate controller for operating the ink stick identification and transporting system. The controller may be a general purpose processor having an associated memory in which programmed instructions are stored. Execution of the programmed instructions enables the controller to obtain data from the sensor in the single insertion port, identify the solid ink stick, and operate the ink stick transporter to move an ink stick to the corresponding feed channel or reject bin. The controller may, alternatively, be an application specific integrated circuit or a group of electronic components configured on a printed circuit for operation of the identification and transport system. Thus, the controller may be implemented in hardware alone, software alone, or a combination of hardware and software.

In printers having a single insertion port with an ink stick type detector, a number of advantages are obtained. For one, the single insertion port is capable of detecting each type of ink stick inserted into the port and is able to transport the identified ink stick to the corresponding feed channel. In this type of printer, all of the feed channels utilize a single transport path from the insertion port to the loading end of each feed channel. This common transport path, in conjunction with gravity feed, dispenses with the need for parallel mechanized feed paths all the way from an insertion port for each feed channel to its corresponding melting assembly. Consequently, less surface area and internal volume are required for the single insertion port having a sensor for obtaining identification data from an ink stick. Additionally, solid ink sticks are identified without requiring distinguishing key plates or other mechanical filters for each feed channel. A printer with feed channels not relying on gravity as the feed force may also benefit from the flexibility of location and minimal external access area provided by the present single insertion port concept.

Figure 7:
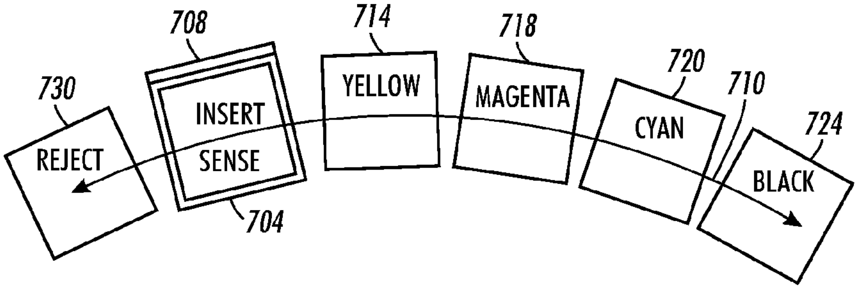
FIG. 7 is an alternative configuration of feed channel entrances, a single insertion port, and a reject bin.
Figure 10:
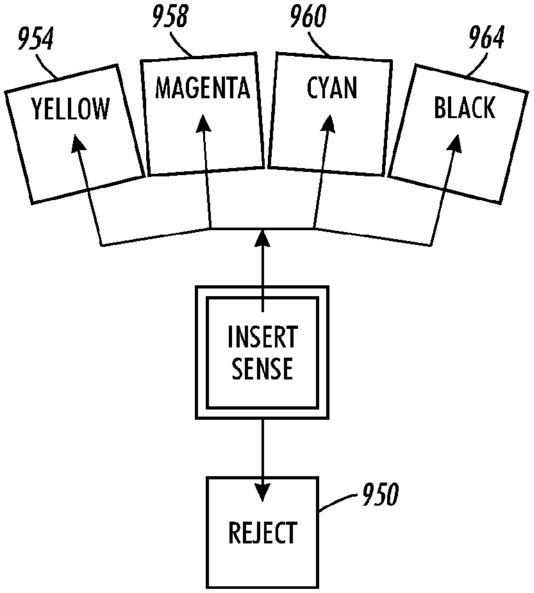
FIG. 10 is an alternative configuration of feed channel entrances, a single insertion port, and a reject bin.

Another advantage of the single insertion port is the flexibility obtained for arranging the feed channels with relation to the port and one another. For example, FIG. 7 depicts a configuration in which the insertion port 704 has one or more sensors 708 positioned in the port to obtain ink stick identification data from a side surface of the ink stick. The transporter 710 is configured to be bidirectional. In response to the ink stick identification data indicating the ink stick is configured for use in one of the feed channels 714, 718, 720, or 724, the transporter is operated by a processor in one direction to deliver the ink stick to the corresponding feed channel. In response to the ink stick identification data indicating the ink stick is not configured for use in one of the feed channels 714, 718, 720, or 724, the transporter is operated by a processor in the other direction to deliver the ink stick to the reject bin 730. A similar radial configuration is shown in FIG. 10. In the arrangement of FIG. 10, the reject channel 950 is not aligned with the radial configuration of the feed channels 954, 958, 960, and 964.

Figure 8:
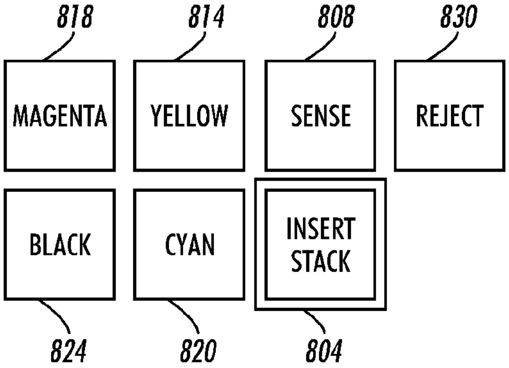
FIG. 8 is an alternative configuration of feed channel entrances, a single insertion port, and a reject bin.
Figure 9:
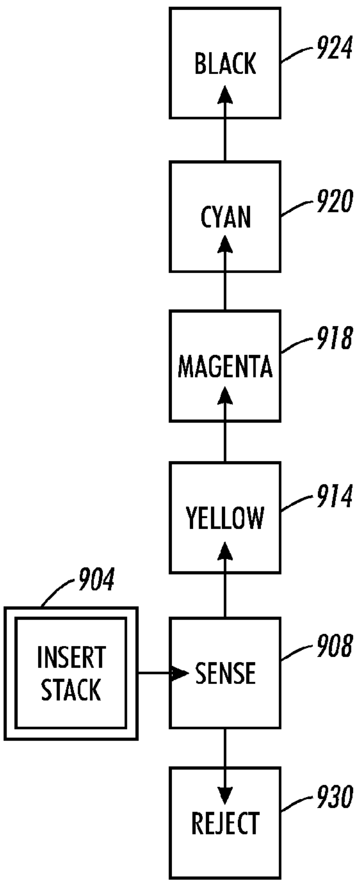
FIG. 9 is an alternative configuration of feed channel entrances, a single insertion port, and a reject bin.

In the configuration shown in FIG. 8, the insertion port functions are separated into two different areas. The insert stack 804 may be implemented as a vertical stack of ink sticks that are urged by gravity to the floor of the stack. A transporter at the floor of the stack moves an ink stick to a sensing area 808. The sensing area 808 includes one or more sensors for obtaining ink stick identification data from a surface of the ink stick. The transporter (not shown) is configured to be bidirectional. In response to the ink stick identification data indicating the ink stick is configured for use in one of the feed channels 814, 818, 820, or 824, the transporter is operated by a processor in one direction to deliver the ink stick to the corresponding feed channel. In response to the ink stick identification data indicating the ink stick is not configured for use in one of the feed channels 814, 818, 820, or 824, the transporter is operated by a processor in the other direction to deliver the ink stick to the reject bin 830. A similar configuration is shown in FIG. 9. In the configuration of that figure, the feed channels 914, 918, 920, and 924 are arranged linearly with the reject bin 930 and sensing area 908 rather than the multi-columnar arrangement of FIG. 8. The insert port 904 may be a gravity fed stack as described with reference to FIG. 8.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A system for providing solid ink to a printer comprising:

a single insertion port for the printer that receives solid ink sticks;

a plurality of melting devices, each melting device being configured to heat solid ink sticks proximate the melting device to a melting temperature;

a plurality of feed channels, each feed channel in the plurality of feed channels having a first end and a second end, the first end of each feed channel is configured to receive solid ink sticks and the second end of each feed channel terminates into only one melting device in the plurality of melting devices;

a sensor that generates an electrical signal that identifies a solid ink stick received in the single insertion port for the printer; and a single ink stick transporter configured to move solid ink sticks from the single insertion port for the printer to each feed channel in the plurality of feed channels to enable solid ink sticks received and identified in the single insertion port for the printer to be delivered to the feed channel in the plurality of feed channels that corresponds to the identified solid ink stick.

2. The system of claim 1, the sensor further comprising:

an optical source configured to illuminate a portion of the solid ink stick received by the single insertion port for the printer;

an optical detector configured to receive light from the optical source that has been reflected by the solid ink stick and to generate an electrical signal corresponding to the reflected light; and a processor configured to compare the electrical signal generated by the optical detector to data stored in the printer to identify the ink stick inserted in the single insertion port for the printer.

3. The system of claim 1, the sensor further comprising:

a mechanically displaceable actuator positioned to interact with a solid ink stick received in the single insertion port for the printer and to generate an electrical signal indicative of the mechanically displaceable actuator interacting with the solid ink stick received in the single insertion port for the printer; and a processor configured to compare the electrical signal generated by the mechanically displaceable actuator to data stored in the printer to identify the solid ink stick inserted in the single insertion port for the printer.

4. The system of claim 1, the single insertion port for the printer further comprising:

a displaceable cover to expose the single insertion port for the printer selectively and to activate the sensor for identifying the solid ink stick received in the single insertion port for the printer.

5. The system of claim 1, the single ink stick transporter further comprising:

a clamp configured to secure and release a solid ink stick identified by the sensor; and a drive member coupled to the clamp to operate the clamp and to move the clamp to the feed channel in the plurality of feed channels that corresponds to the identified solid ink stick.

6. The system of claim 5 further comprising:

a stop member that is configured to rotate to a position to stop the clamp at the feed channel corresponding to the identified ink stick; and the clamp further comprising:

a pair of pivotable jaws coupled to the drive member, the drive member closing the jaws in response to the drive member being translated in one direction and opening the jaws in response to the drive member being translated in an opposite direction.

7. The system of claim 1 further comprising:

a second sensor configured to generate an electrical signal indicating a solid ink stick is proximate the sensor that generates an electrical signal that identifies a solid ink stick received in the single insertion port for the printer; and a processor configured to compare the electrical signal generated by the sensor to data stored in the system to identify the ink stick inserted in the single insertion port for the printer in response to the electrical signal generated by the second sensor.

8. The system of claim 1 further comprising:

a processor configured to compare the electrical signal generated by the sensor to data stored in the printer to identify the ink stick inserted in the single insertion port for the printer; and a reject location to which the single ink stick transporter moves the solid ink stick from the single insertion port for the printer in response to the ink stick identification data not corresponding to the data stored in the printer.

9. The system of claim 1, the single ink stick transporter further comprising:

a pair of endless belts, the endless belts being parallel to one another and separated by a first distance; and a spreader coupled to at least one end of one endless belt, the spreader being actuated to move the at least one end of the one endless belt away from the other endless belt by a distance greater than the first distance to enable a solid ink stick supported by the pair of endless belts to drop between the belts.

10. The system of claim 9, the single insertion port for the printer further comprising:

a pusher configured for reciprocating movement to move a solid ink stick from the single insertion port for the printer onto the pair of endless belts.

11. A method for providing solid ink to a melting device in a solid ink printer comprising:

receiving solid ink sticks through only one insertion port in the solid ink printer;

identifying each solid ink stick received in the only insertion port in the solid ink printer; and transporting each identified ink stick from the only insertion port in the solid ink printer to any feed channel in a plurality of feed channels that corresponds to the identified solid ink stick to enable delivery of each identified solid ink stick from the only insertion port in the solid ink printer to the feed channel in the plurality of feed channels that corresponds to the identified solid ink stick.

12. The method of claim 11, the ink stick identification further comprising:

illuminating a portion of a solid ink stick received in the only insertion port in the solid ink printer;

receiving light reflected by the solid ink stick;

generating an electrical signal corresponding to the received reflected light; and comparing the generated electrical signal to data stored in the solid ink printer to identify the solid ink stick inserted in the only insertion port in the solid ink printer.

13. The method of claim 11, the solid ink stick identification further comprising:

generating an electrical signal indicative of an interaction between the solid ink stick received in the only insertion port in the solid ink printer and an actuator proximate the only insertion port in the solid ink printer; and comparing the generated electrical signal to data stored in the solid ink printer to identify the solid ink stick inserted in the only insertion port in the solid ink printer.

14. The method of claim 11 further comprising:

displacing a cover over the only insertion port in the solid ink printer to expose the only insertion port in the solid ink printer and to activate a sensor used to identify the solid ink stick received in the only insertion port in the solid ink printer.

15. The method of claim 11, the ink stick transportation further comprising:

securing a clamp about a solid ink stick in the only insertion port in the solid ink printer;

moving the clamp to transport the solid ink stick to the feed channel in the plurality of feed channels that corresponds to the identified solid ink stick; and releasing the solid ink stick from the clamp in response to the clamp being moved to the feed channel in the plurality of feed channels that corresponds to the identified solid ink stick.

16. The method of claim 11 further comprising:

generating an electrical signal having identification data for a solid ink stick in the only insertion port in the solid ink printer;

comparing the generated electrical signal to data stored in the solid ink printer to identify the solid ink stick inserted in the only insertion port in the solid ink printer; and transporting a solid ink stick from the only insertion port in the solid ink printer to a reject location in response to the generated electrical signal not corresponding to the data stored in the solid ink printer.

17. The method of claim 15 further comprising:

rotating a stop member to a position at the feed channel in the plurality of feed channels that corresponds to the identified solid ink stick to block movement of the clamp past the feed channel in the plurality of feed channels that corresponds to the identified solid ink stick.

18. The method of claim 15 further comprising:

pivoting a pair of jaws to clamp the solid ink stick in response to a drive member being translated in one direction; and pivoting the pair of jaws to release the solid ink stick in response to the drive member being translated in an opposite direction.

19. The method of claim 11, the ink stick transportation further comprising:

moving a solid ink stick to the feed channel in the plurality of feed channels that corresponds to the identified solid ink stick on a pair of endless belts that are parallel to one another and separated by a first distance; and separating at least one end of one endless belt from the other endless belt by a distance that is greater than the first distance to move the at least one end of the one endless belt away from the other endless belt to enable the solid ink stick to drop between the endless belts.

20. The method of claim 19 further comprising:

pushing the solid ink stick from the only insertion port in the solid ink printer onto the pair of endless belts to enable the solid ink stick to be moved to the feed channel in the plurality of feed channels that corresponds to the identified solid ink stick.

* * * * *